United States Patent
Jessberger et al.

(10) Patent No.: US 6,588,389 B1
(45) Date of Patent: Jul. 8, 2003

(54) SHIFT DRUM

(75) Inventors: Thomas Jessberger, Rutesheim (DE); Heinz Dobusch, Marbach (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 1 day.

(21) Appl. No.: 09/831,725

(22) PCT Filed: Aug. 9, 2000

(86) PCT No.: PCT/EP00/07737

§ 371 (c)(1),
(2), (4) Date: Aug. 1, 2001

(87) PCT Pub. No.: WO01/20144

PCT Pub. Date: Mar. 22, 2001

(30) Foreign Application Priority Data

Sep. 15, 1999 (DE) .......................... 199 44 108

(51) Int. Cl.[7] ............................... F02B 27/02
(52) U.S. Cl. ................................. 123/184.55
(58) Field of Search ................ 123/184.55, 184.61

(56) References Cited

U.S. PATENT DOCUMENTS

| | | | | |
|---|---|---|---|---|
| 4,932,369 A | * | 6/1990 | Parr ...................... | 123/184.42 |
| 5,438,964 A | * | 8/1995 | Breidenbach .......... | 123/184.55 |
| 5,546,900 A | * | 8/1996 | Adamek et al. ....... | 123/184.55 |
| 5,901,677 A | * | 5/1999 | Ohrnberger et al. ... | 123/184.31 |
| 6,138,628 A | * | 10/2000 | Alex et al. ............... | 123/190.1 |
| 6,176,213 B1 | * | 1/2001 | Arnegger ............... | 123/184.61 |
| 6,216,657 B1 | * | 4/2001 | Paffrath et al. ........ | 123/184.55 |
| 6,382,162 B2 | * | 5/2002 | Umino et al. .......... | 123/184.55 |

* cited by examiner

Primary Examiner—Willis R. Wolfe
Assistant Examiner—Jason Benton
(74) Attorney, Agent, or Firm—Crowell & Moring LLP

(57) ABSTRACT

A shift drum (10), especially for use in an intake manifold arrangement for a multi-cylinder internal combustion engine, having an induction distributor, long individual suction pipes (27) that are arranged adjacent one another, and short individual suction pipes (28) that are situated interiorly. The shift drum (10) is arranged in a longitudinal bore (26) which intersects at least the short individual suction pipes (28). Shift drum (10) is further provided with radial seals (13) which seal the individual pipes (27, 28) from each other. Separate seals (12) are provided which are fixed in position on the shift drum (10) for sealing off long individual suction pipes (27) from short individual suction pipes (28) in a closed position.

10 Claims, 4 Drawing Sheets

SHIFT DRUM

BACKGROUND OF THE INVENTION

The invention relates to a shift drum for use in a suction pipe arrangement for a multi-cylinder internal combustion engine with an induction distributor and with first individual suction pipes arranged side by side and ending in a flange and with second individual suction pipes.

DE 197 12 680 discloses a shift drum for use in a suction pipe arrangement for a multi-cylinder internal combustion engine with first individual suction pipes arranged side by side and second individual suction pipes located in the interior. This shift drum is inserted into a longitudinal bore, which intersects at least the first or the second individual suction pipes and which has a sealing element mounted thereto for each individual suction pipe. This sealing element comprises two sealing strips, which at their ends are connected with two ring elements. The sealing strips lie resiliently against the inlet or outlet opening of the longitudinal bore which contains the shift drum.

The one-part design of the sealing element makes it possible to combine the axial and radial seal in one component. But this constitutes only a compromise solution for the two sealing situations. In the one-part design, the axial sealing strips cannot be mounted without play because they adjoin the radial sealing areas. This causes air leakage flow between the sealing element and the shift drum. A further drawback of the one-part design of the sealing element is the mutual double seal of two adjacent individual suction pipes arranged side by side. Since each sealing element comprises two radial sealing areas, whereas a single radial component would be sufficient mutually to seal the individual suction pipes, a greater overall volume is required. In addition, due to the complex geometry of the sealing element, the injection mold is complex and costly.

DE 44 23 427 discloses an induction system for a multi-cylinder internal combustion engine with first and second individual suction pipes of different length. Said first and second individual suction pipes are arranged side by side. The first individual suction pipes are separated from the second individual suction pipes by a shift drum. To seal adjacent individual suction pipes, piston ring type sealing elements are mounted to the shift drum, so that a piston ring separates two adjacent individual suction pipes from one another. In this embodiment, however, no axial sealing elements are provided to separate the first from the second individual suction pipes. To improve the charging effect by the negative pressure wave, which is produced by opening the valves on the cylinder block, a seal between the first and the second individual suction pipes is required.

SUMMARY OF THE INVENTION

The object of the invention is to create a sealing body, which has good sealing properties, requires little mounting space, and ensures cost-effective production. This object is attained by the invention as described and claimed hereinafter.

The shift drum according to the invention, due to its arrangement in a longitudinal bore, is particularly suitable mutually to seal individual suction pipes arranged side by side, which are intersected by the longitudinal bore. To this end, radial sealing means are used, which are dimensioned in such a way that in their mounted state they fit against the longitudinal bore surrounding the shift drum to form a seal. The radial sealing means may also rotate together with the shift drum.

In the suction pipe arrangement with first and second individual suction pipes of different lengths, a channel may be closed off by means of the shift drum disposed in the longitudinal bore. To this end, said shift drum comprises separate seals mounted to the shift drum, which in closed position, seal the associated individual suction pipes with respect to one another. Said seals directly adjoin the radial sealing means. They may have a wide variety of contours; e.g., the sealing-surfaces may be angled with respect to the shift drum axis to obtain additional guidance of the shift drum within the longitudinal bore. Each of the first individual suction pipes has its own seal, which is independent from the individual suction pipe arranged adjacent thereto. Separating the axial from the radial sealing function makes it possible optimally to tune the two components to their function. For fixation to the shift drum, the seal no longer requires elements clasping the periphery of the shift drum, since the seal may be attached to the shift drum, for instance by gluing.

In a special embodiment, the seal has two axially effective sealing surfaces. The sealing surfaces of the seal are arranged in such a way that in a closed position, the individual suction pipe is sealed by the sealing surfaces, and the axial sealing surfaces directly adjoin the radial sealing means.

According to a further embodiment, the seal has a prestressing area. This area is stretched during installation, so that the seal can be mounted to the shift drum. In the assembled state, a certain prestressing force remains which causes the seal to remain at its prescribed location and to perform its sealing function. The prestressing area may be designed, for example, as a shaped spring, a curved spring, or a rubber lip.

In a special embodiment, the seal is positively locked, for instance by clipping or latching. To this end, the shift drum has a holder for the seal. This holder is configured in such a way that partial areas of the seal are enclosed to fix the seal to the shift drum when mounted. This holder may take the form of, for example, hooks or grooves.

An advantageous further embodiment of the inventive concept is to use a seal with a flow cap, which positively influences the course of the flow along the sealed opening of the individual suction pipes to prevent turbulence. This flow cap may be mounted as a separate component to a sealing contour of the seal, e.g. by gluing, welding, screwing or snapping. The flow cap may furthermore be made of a different material than the sealing contour.

A special embodiment of the invention envisions forming the seal directly on the flow cap. This may be accomplished by injection molding. If configured accordingly, the flow cap may also perform the role of the prestressing area.

A further variant of the invention is to provide the seal with clamp clips, which are used to mount the seal to the shift drum and which enclose only a partial area of the shift drum periphery. The seal may be clamped to the shift drum by means of these clamping clips. Another alternative to attach the seal is to place it on the shift drum and then to insert this preassembled unit into the longitudinal bore. Insertion of the shift drum causes the individual seals to be pressed firmly against the shift drum so that they are fixed.

To this end, it is advantageous to mold an elastomer to the seal. The elastomer is compressed during installation and is thus prestressed. This separates the individual suction pipes while producing a seal. Furthermore, the elastomer can compensate for manufacturing tolerances as well as the relaxation of the sealing element.

According to a further embodiment of the invention, the seal is configured in such a way that it completely encircles and seals the opening in the shift drum. To obtain a complete seal of the shift drum, two sealing elements are required, which seal the opening in the shift drum of each individual suction pipe.

It is advantageous to make the seal of synthetic resin material, so that even complex contours can be produced. Synthetic resin material furthermore has good sealing and frictional properties.

These and other features of preferred further developments of the invention are set forth in the claims as well as in the description and the drawings. The individual features may be implemented either alone or in combination in the embodiment of the invention or in other fields of application and may represent advantageous embodiments that are protectable per se, for which protection is herewith claimed.

BRIEF DESCRIPTION OF THE DRAWINGS

Further details will now be described with reference to schematic illustrative embodiments shown in the drawings in which.

DETAILED DESCRIPTION OF PREFERRED EMBODIMENTS

Figure 1:
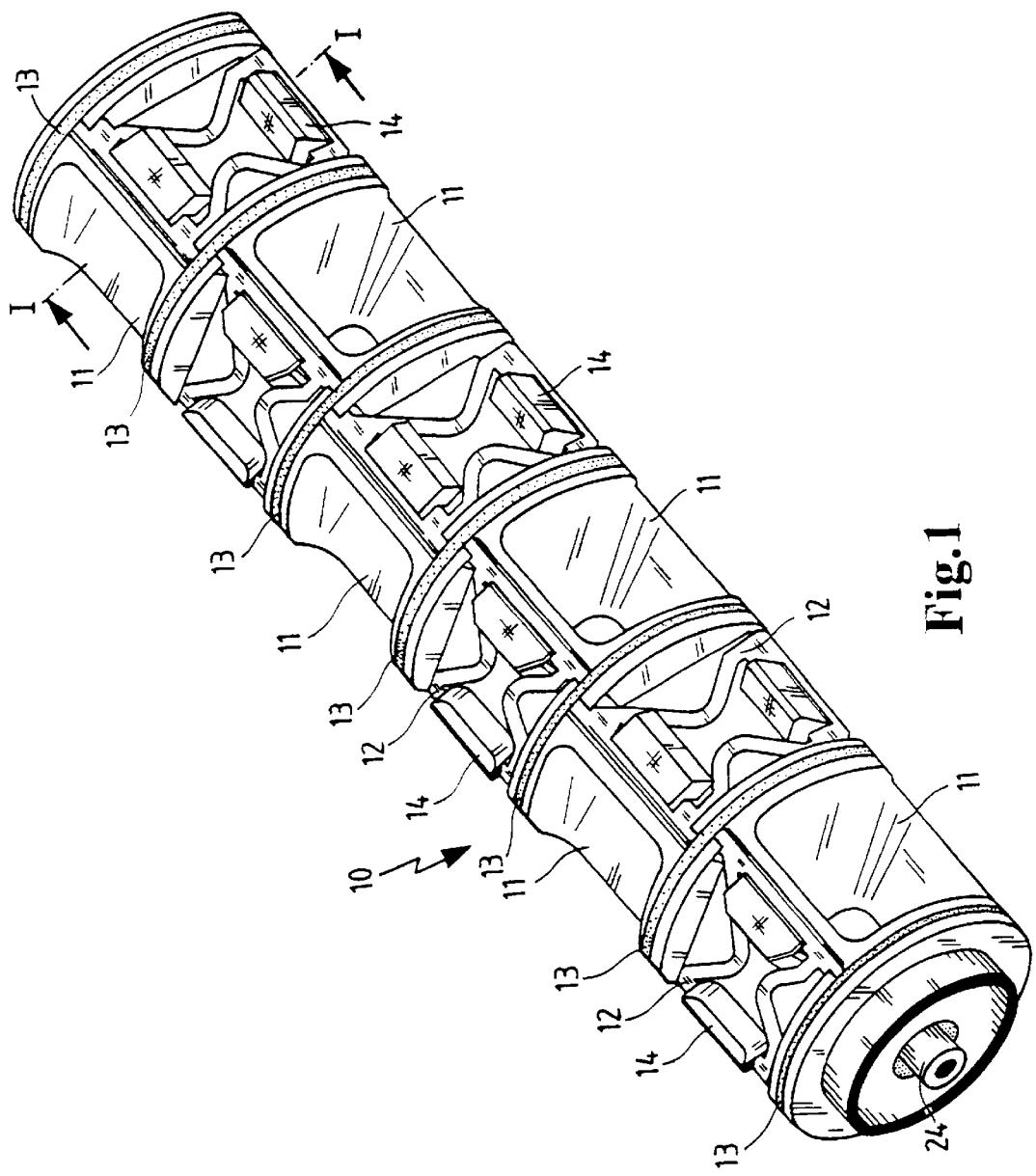
FIG. 1 shows a perspective view of a shift drum.
Figure 7:
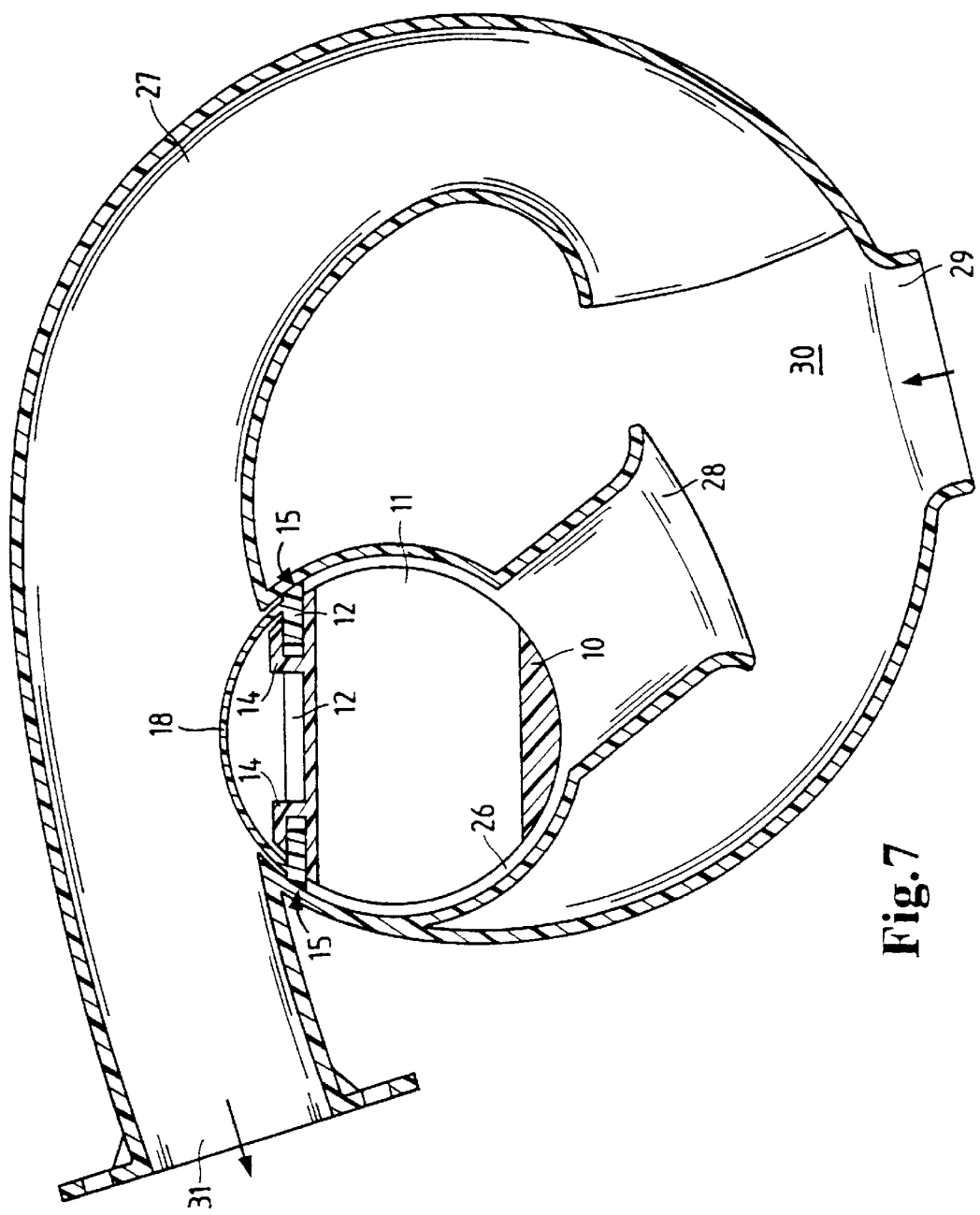
FIG. 7 shows a sectional view through a suction pipe arrangement.

FIG. 1 is a perspective view of a shift drum 10. It essentially comprises passage openings 11, seals 12, radial sealing means 13, and a bearing area 24. Passage openings 11 are configured in such a way that, in a corresponding position of the shift drum 10, first individual suction pipes 27 communicate with second individual suction pipes 28 in accordance with FIG. 7 in a suction pipe arrangement for a multi-cylinder internal combustion engine. Seals 12 are designed such that, in a closed position, a seal 12 seals the first against the second individual suction pipes 27, 28 as shown in FIG. 7, so that there is hardly any air leakage. Seals 12 are hooked into hooks 14. The radial sealing means 13 encircle shift drum 10 along its periphery. They seal individual suction pipes extending parallel to one another and directly adjoin seals 12.

Figure 2:
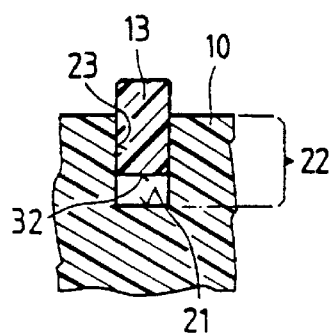
FIG. 2 shows detail X in accordance with FIG. 1 in section.

FIG. 2 depicts a detail X of FIG. 1 in section. The radial sealing means 13 are slit, so that they can be bent open and placed onto the shift drum 10. After installation, the radial sealing means 13 spring together again and completely encircle shift drum 10. In their mounted state, radial sealing means 13 are supported against the longitudinal bore 26 of the suction pipe arrangement in accordance with FIG. 7, which causes the shift drum 10 to rotate inside the radial sealing means 13. Shift drum 10 has a groove 22 with an outside diameter 21 and sidewalls 23. To prevent large frictional forces between radial sealing means 13 and shift drum 10, the radial sealing means 13 has an inside diameter 32, which is not in direct contact with the outside diameter 21 of shift drum 10. Thus, direct contact exists only between sidewalls 23 and radial sealing means 13.

Figure 3:
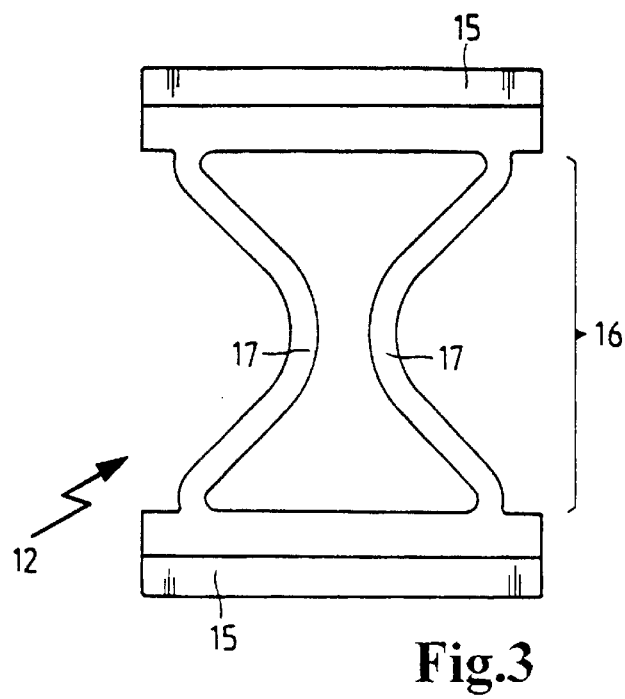
FIG. 3 shows an elevational view of a seal.

FIG. 3 shows a seal 12, which has two axially effective sealing surfaces 15. A prestressing area 16 comprising two curved springs 17, which extend in mirror image to one another, is formed onto said axially effective sealing surfaces 15. The curved springs 17 are configured in such a way that they can be pulled apart during installation so that their curved-shape is extended. After seal 12 has been hooked onto shift drum 10 as shown in FIG. 1, the curved springs 17 contract again to prevent seal 12 from becoming detached from shift drum 10. Seal 12 is longer than the available installation space inside longitudinal bore 26 as shown in FIG. 7. As a result the axially effective sealing surfaces 15 are compressed and a prestressed state is produced in the prestressing area 16 so that the axially effective sealing surfaces 15 are pressed against the wall of the longitudinal bore (not shown). Seal 12 is flat.

Figure 4:
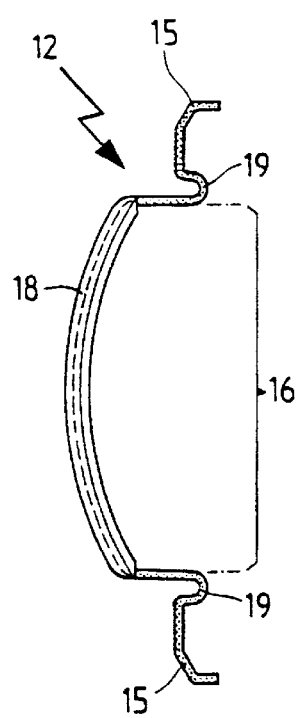
FIG. 4 shows a side view of a seal with a flow cap.

FIG. 4 is a side view of a seal 12 with a flow cap 18. Flow cap 18 is shaped like an arc. This makes it possible, in special arrangements, to guide the airflow without turbulence. In this embodiment, the flow cap 18 is formed onto the axially effective sealing surfaces 15 by means of bars 19 and, in addition, forms a prestressing area 16. To mount seal 12, the flow cap 18 is stretched, which causes its arc shape to be flattened. After seal 12 has been installed, flow cap 18 contracts again and reassumes its arc shape. Prestressing in flow cap 18 prevents seal 12 from becoming detached from shift drum 10 in accordance with FIG. 1.

Figure 5:
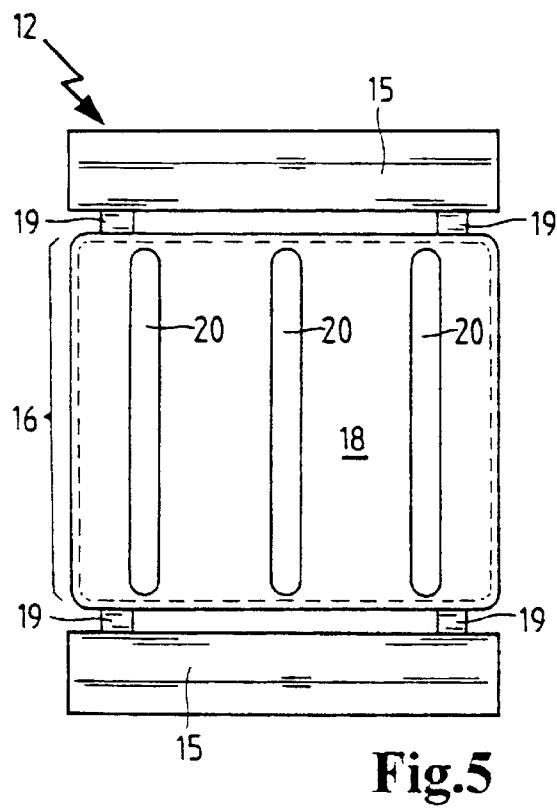
FIG. 5 shows an elevation of a seal with flow cap.

FIG. 5 shows a front view of seal 12 according to FIG. 4. The axially effective sealing surfaces 15 are connected by bars 19 to flow cap 18. Bars 19 are spaced apart in such a way that hooks 14 according to FIG. 1 can engage and fix seal 12. To increase its rigidity, flow cap 18 is provided with beads 20.

Figure 6:
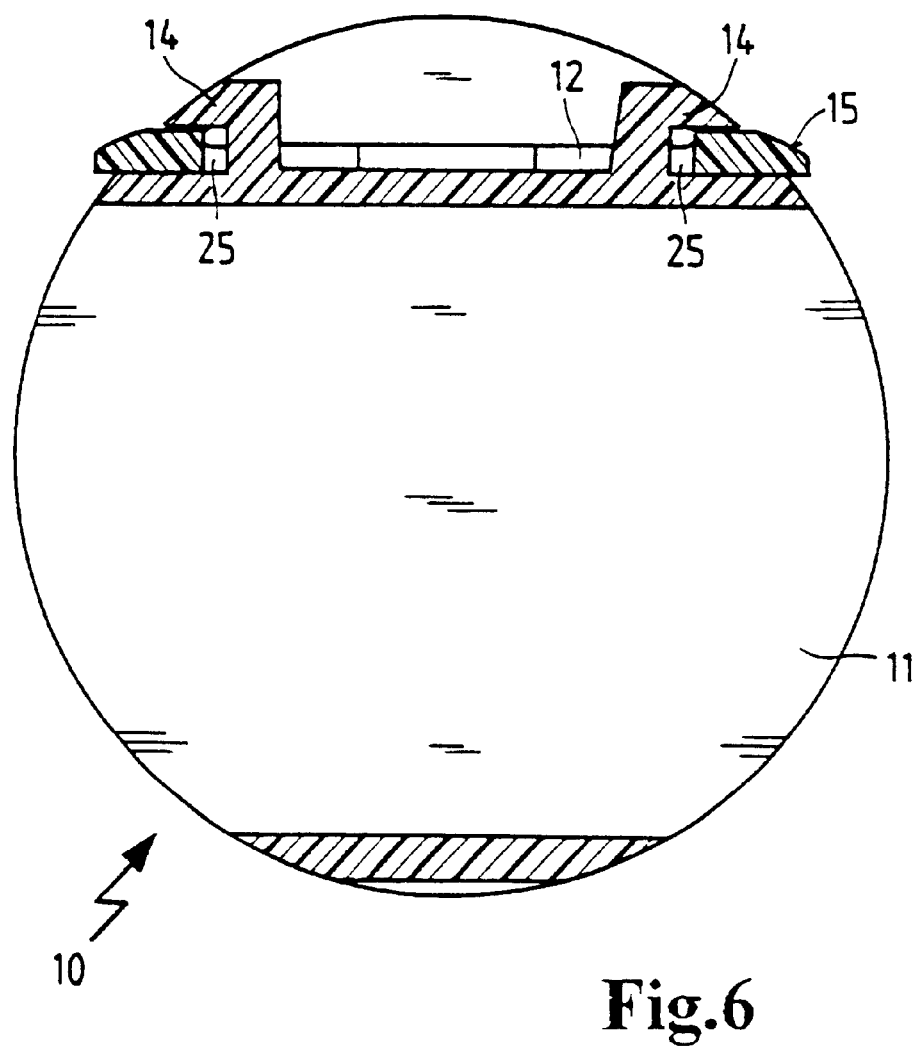
FIG. 6 shows a section through the shift drum.

FIG. 6 is a section through shift drum 10 along line I—I of FIG. 1. Seal 12 is fastened to hooks 14, which are designed to receive seal 12. During installation, the axially effective sealing surfaces 15 are partly pressed into a gap 25. Due to the inner prestressing of seal 12, a portion of the axially effective sealing surfaces 15 presses outwardly and fits against longitudinal bore 26 as shown in FIG. 7 (not depicted here). Prestressing area 16 is capable of producing prestressing in the direction of longitudinal bore 26.

FIG. 7 is a section through a suction pipe arrangement. It comprises an inlet 29 for air, a plenum 30, a plurality of first and second individual suction pipes 27, 28 starting from plenum 30, which differ in their length (only one first and one second individual suction pipe 27, 28 are depicted here), an outlet 31, which conducts the air to the cylinder head (not depicted), and a shift drum 10 in its installed state, depicted in its closed position. Shift drum 10 is located inside a longitudinal bore 26, which intersects the first individual pipes 27 and the second individual pipes 28.

Seal 12 has a flow cap 18, which positively influences the flow inside the first individual suction pipe 27. The axially effective sealing surfaces 15 contact the longitudinal bore 26. This prevents air from the second individual suction pipe 28 from getting into the first individual suction pipe 27. By rotating the shift drum 10, the open position can be produced. The radial sealing means 13 (not depicted here) then mutually seal only those individual suction pipes 27 or 28 that extend parallel to one another. The passage opening 11 connects the individual suction pipes 27, 28 with each other.

What is claimed is:

1. A shift drum for use in an intake manifold arrangement for a multi-cylinder internal combustion engine, said intake manifold arrangement comprising an induction distributor, a plurality of first individual suction pipes arranged side by side and ending in a flange, and a plurality of second individual suction pipes, wherein said shift drum serves to open and close said second individual suction pipes and is arranged in a longitudinal bore which intersects said individual suction pipes, said shift drum having radial seals for sealing the individual suction pipes with respect to one another, and a separate seal is fixed to the shift drum for sealing switched individual suction pipes in a closed position.

2. A shift drum according to claim 1, wherein said separate seal has at least two axially effective sealing surfaces.

3. A shift drum according to claim 1, wherein said separate seal has a prestressing area.

4. A shift drum according to claim 1, wherein said separate seal is attached by an interlocking connection.

5. A shift drum according to claim 1, wherein said separate seal comprises a flow cap.

6. A shift drum according to claim 1, wherein said flow cap is formed onto said separate seal.

7. A shift drum according to claim 1, wherein said separate seal has clamping elements formed thereon for attachment to a control shaft.

8. A shift drum according to claim 1, wherein an elastomer is molded onto said separate seal.

9. A shift drum according to claim 1, wherein said separate seal completely encircles an opening of an individual suction pipe.

10. A shift drum according to claim 1, wherein said separate seal is made of synthetic resin material.

* * * * *